(12) United States Patent
Laster et al.

(10) Patent No.: US 10,309,655 B2
(45) Date of Patent: Jun. 4, 2019

(54) COOLING SYSTEM FOR FUEL NOZZLES WITHIN COMBUSTOR IN A TURBINE ENGINE

(71) Applicant: Siemens Energy, Inc., Orlando, FL (US)

(72) Inventors: Walter Ray Laster, Oviedo, FL (US); Scott M. Martin, Daytona Beach, FL (US); Juan Enrique Portillo Bilbao, Oviedo, FL (US); Jacob William Hardes, Charlotte, NC (US); Timothy A. Fox, Hamilton (CA)

(73) Assignee: SIEMENS ENERGY, INC., Orlando, FL (US)

( * ) Notice: Subject to any disclaimer, the term of this patent is extended or adjusted under 35 U.S.C. 154(b) by 214 days.

(21) Appl. No.: 15/500,954

(22) PCT Filed: Aug. 26, 2014

(86) PCT No.: PCT/US2014/052626
§ 371 (c)(1),
(2) Date: Feb. 1, 2017

(87) PCT Pub. No.: WO2016/032436
PCT Pub. Date: Mar. 3, 2016

(65) Prior Publication Data
US 2017/0219212 A1    Aug. 3, 2017

(51) Int. Cl.
*F23R 3/04* (2006.01)
*F23R 3/34* (2006.01)
(Continued)

(52) U.S. Cl.
CPC ............... *F23R 3/283* (2013.01); *F02C 3/30* (2013.01); *F23R 3/045* (2013.01); *F23R 3/34* (2013.01);
(Continued)

(58) Field of Classification Search
CPC ..... F23R 3/02; F23R 3/045; F23R 3/06; F23R 3/283; F23R 3/286; F23R 3/34; F23R 3/346; F02C 3/30; F02C 7/22; F02C 7/222
See application file for complete search history.

(56) References Cited

U.S. PATENT DOCUMENTS

| | | | | |
|---|---|---|---|---|
| 2,612,405 A | * | 9/1952 | Kirschbaum | ......... B05B 7/0416 239/404 |
| 3,934,409 A | * | 1/1976 | Quillevere | ................ F23R 3/34 60/749 |

(Continued)

FOREIGN PATENT DOCUMENTS

| CN | 103185353 A | 7/2013 |
|---|---|---|
| CN | 103185354 A | 7/2013 |

(Continued)

OTHER PUBLICATIONS

PCT International Search Report and Written Opinion dated Apr. 24, 2015 corresponding to PCT Application No. PCT/US2014/052626 filed Aug. 26, 2014.

*Primary Examiner* — Todd E Manahan
*Assistant Examiner* — Eric W Linderman

(57) ABSTRACT

A cooling system for a fuel system in a turbine engine that is usable to cool a fuel nozzle is disclosed. The cooling system may include one or more cooling system housings positioned around the fuel nozzle, such that the cooling system housing forms a cooling chamber defined at least partially by an inner surface of the cooling system housing and an outer surface of the fuel nozzle. The fuel nozzle may extend into a combustor chamber formed at least in part by a combustor housing. The fuel nozzle may include one or more fuel exhaust orifices with an opening in an outer surface of the fuel nozzle and configured to exhaust fluids unrestricted by the housing forming the cooling system (Continued)

cooling chamber. The cooling system may provide cooling fluids to cool the fuel nozzle within the cooling system cooling chamber regardless of whether the fuel nozzle is in use.

16 Claims, 3 Drawing Sheets

(51) Int. Cl.
*F23R 3/28* (2006.01)
*F02C 3/30* (2006.01)
*F23R 3/02* (2006.01)
*F23R 3/16* (2006.01)
*F02C 7/22* (2006.01)
*F23R 3/06* (2006.01)

(52) U.S. Cl.
CPC ............... *F02C 7/22* (2013.01); *F02C 7/222* (2013.01); *F23R 3/02* (2013.01); *F23R 3/06* (2013.01); *F23R 3/16* (2013.01); *F23R 3/286* (2013.01); *F23R 3/346* (2013.01)

(56) References Cited

U.S. PATENT DOCUMENTS

| | | | |
|---|---|---|---|
| 4,105,163 A * | 8/1978 | Davis, Jr. | F23D 11/107 239/406 |
| 4,389,848 A * | 6/1983 | Markowski | F23R 3/34 431/352 |
| 4,483,137 A * | 11/1984 | Faulkner | F02C 3/30 60/39.55 |
| 4,600,151 A * | 7/1986 | Bradley | F23D 11/107 239/400 |
| 5,115,634 A * | 5/1992 | Bretz | B05B 7/066 60/778 |
| 5,165,241 A * | 11/1992 | Joshi | F23R 3/14 60/737 |
| 5,361,578 A * | 11/1994 | Donlan | F02C 3/30 60/39.55 |
| 5,590,529 A * | 1/1997 | Joshi | F23R 3/38 239/403 |
| 5,749,219 A * | 5/1998 | DuBell | F02C 7/26 60/733 |
| 6,021,635 A * | 2/2000 | Gaag | F23R 3/36 239/400 |
| 6,141,967 A * | 11/2000 | Angel | F23R 3/14 239/405 |
| 6,192,688 B1 * | 2/2001 | Beebe | F23L 7/00 60/723 |
| 6,311,471 B1 * | 11/2001 | Waldherr | F02C 3/30 60/39.55 |
| 6,363,726 B1 * | 4/2002 | Durbin | F23R 3/14 60/748 |
| 6,868,676 B1 * | 3/2005 | Haynes | F02C 3/14 60/740 |
| 6,923,001 B2 | 8/2005 | Laster et al. | |
| 6,925,809 B2 | 8/2005 | Mowill | |
| 7,104,069 B2 * | 9/2006 | Martling | F23D 17/002 60/39.55 |
| 7,506,516 B2 | 3/2009 | Bruck et al. | |
| 7,752,850 B2 | 7/2010 | Laster et al. | |
| 7,841,182 B2 | 11/2010 | Martin | |
| 8,281,594 B2 * | 10/2012 | Wiebe | F23R 3/283 60/733 |
| 8,381,532 B2 * | 2/2013 | Berry | F01D 9/06 60/751 |
| 8,387,398 B2 | 3/2013 | Martin et al. | |
| 8,495,982 B2 | 7/2013 | Laster et al. | |
| 8,499,564 B2 | 8/2013 | Martin et al. | |
| 8,656,721 B2 * | 2/2014 | Matsumoto | F23R 3/346 60/733 |
| 8,661,779 B2 | 3/2014 | Laster et al. | |
| 9,052,115 B2 * | 6/2015 | Stoia | F23R 3/346 |
| 9,200,808 B2 | 12/2015 | Romig | F23R 3/28 |
| 9,228,499 B2 * | 1/2016 | Stryapunin | F23R 3/286 |
| 9,284,888 B2 * | 3/2016 | Romig | F02C 7/22 |
| 9,366,443 B2 * | 6/2016 | Laster | F23R 3/286 |
| 9,528,705 B2 * | 12/2016 | Melton | F23R 3/283 |
| 9,534,790 B2 * | 1/2017 | Cai | F23R 3/346 |
| 9,551,490 B2 * | 1/2017 | DiCintio | F23R 3/14 |
| 2003/0046934 A1 * | 3/2003 | Sherwood | F23R 3/04 60/722 |
| 2005/0011194 A1 | 1/2005 | Laster et al. | |
| 2006/0156735 A1 | 7/2006 | Laster et al. | |
| 2007/0000254 A1 | 1/2007 | Laster et al. | |
| 2007/0003897 A1 * | 1/2007 | Koizumi | F23R 3/28 431/354 |
| 2007/0014664 A1 * | 1/2007 | Dellmann | F01D 5/187 416/97 R |
| 2009/0084082 A1 * | 4/2009 | Martin | F01D 9/023 60/39.281 |
| 2010/0071373 A1 | 3/2010 | Martin et al. | |
| 2010/0077760 A1 | 4/2010 | Laster et al. | |
| 2010/0212323 A1 | 8/2010 | Martin | |
| 2010/0242482 A1 * | 9/2010 | Kraemer | F02C 7/228 60/746 |
| 2011/0079013 A1 * | 4/2011 | Mehring | F02C 3/145 60/740 |
| 2011/0289928 A1 * | 12/2011 | Fox | F23R 3/286 60/740 |
| 2012/0006029 A1 | 1/2012 | Bilbao et al. | |
| 2012/0291439 A1 * | 11/2012 | Oskam | F23R 3/286 60/737 |
| 2013/0031907 A1 * | 2/2013 | Woerz | F02C 3/30 60/740 |
| 2013/0040255 A1 * | 2/2013 | Shi | F23N 1/002 431/354 |
| 2013/0133330 A1 | 5/2013 | Laster et al. | |
| 2013/0152593 A1 * | 6/2013 | Oskam | F23R 3/28 60/772 |
| 2013/0167538 A1 | 7/2013 | Laster et al. | |
| 2014/0338359 A1 * | 11/2014 | Valeev | F23L 7/00 60/776 |
| 2016/0201908 A1 * | 7/2016 | Drake | F23R 3/002 60/782 |
| 2016/0313007 A1 * | 10/2016 | Martini | F23R 3/04 |
| 2017/0114717 A1 * | 4/2017 | Martin | F02C 3/34 |
| 2017/0356656 A1 * | 12/2017 | Ogata | F23R 3/28 |

FOREIGN PATENT DOCUMENTS

| | | |
|---|---|---|
| JP | H06055050 U | 7/1994 |
| JP | 2000074371 A | 3/2000 |
| JP | 2006010193 A | 1/2006 |
| JP | 2006029675 A | 2/2006 |
| JP | 2010236550 A | 10/2010 |
| JP | 2010539437 A | 12/2010 |

* cited by examiner

COOLING SYSTEM FOR FUEL NOZZLES WITHIN COMBUSTOR IN A TURBINE ENGINE

STATEMENT REGARDING FEDERALLY SPONSORED RESEARCH OR DEVELOPMENT

Development of this invention was supported in part by the United States Department of Energy, Advanced Turbine Development Program, Contract No. DE-FC26-05NT42644. Accordingly, the United States Government may have certain rights in this invention.

FIELD OF THE INVENTION

This invention is directed generally to turbine engines, and more particularly to cooling systems for components of a fuel system within combustors of gas turbine engines.

BACKGROUND

Typically, gas turbine engines include a plurality of injectors for injecting fuel into a combustor to mix with air upstream of a flame zone. The fuel injectors of conventional turbine engines may be arranged in one of at least three different schemes. Fuel injectors may be positioned in a lean premix flame system in which fuel is injected in the air stream far enough upstream of the location at which the fuel/air mixture is ignited that the air and fuel are completely mixed upon burning in the flame zone. Fuel injectors may also be configured in a diffusion flame system such that fuel and air are mixed and burned simultaneously. In yet another configuration, often referred to as a partially premixed system, fuel injectors may inject fuel upstream of the flame zone a sufficient distance that some of the air is mixed with the fuel. Partially premixed systems are combinations of a lean premix flame system and a diffusion flame system.

In addition, axial stage fuel nozzles have been positioned within secondary combustion zones downstream from the main combustion zones. The axial stage fuel nozzles enable high temperature operation with low NOx and reduced combustor dynamics. The axial stage fuel nozzles can emit fuel or a mixture of fuel and a diluent (typically steam) downstream of the main combustion zones. The axial stage fuel nozzles will typically fail if the fuel or diluent steam flow is shut off. While steam diluent is effective to use as a coolant, it is also expensive. Thus, a more cost efficient cooling system is needed.

SUMMARY OF THE INVENTION

A cooling system for a fuel system in a turbine engine that is usable to cool a fuel nozzle is disclosed. The cooling system may include one or more cooling system housings positioned around the fuel nozzle such that the cooling system housing forms a cooling chamber defined at least partially by an inner surface of the cooling system housing and an outer surface of the fuel nozzle. The fuel nozzle 16 may extend into a combustor chamber formed at least in part by a combustor housing. The fuel nozzle may include one or more fuel exhaust orifices with an opening in an outer surface of the fuel nozzle and configured to exhaust fluids unrestricted by the housing forming the cooling system cooling chamber. The cooling system may provide cooling fluids to cool the fuel nozzle within the cooling system cooling chamber regardless of whether the fuel nozzle is in use.

In at least one embodiment, the cooling system may include one or more fuel nozzles extending into a combustor chamber formed at least in part by a combustor housing. The fuel nozzle may include one or more fuel exhaust orifices with an opening in an outer surface of the fuel nozzle. The cooling system may include a cooling system housing positioned around the fuel nozzle. The cooling system housing may form a cooling chamber defined at least partially by an inner surface of the cooling system housing and an outer surface of the fuel nozzle. In at least one embodiment, the fuel nozzle may be an axial stage nozzle positioned within a secondary combustion zone. The fuel nozzle may be positioned generally orthogonal to a direction of hot gas flow within the secondary combustion zone. The fuel nozzle may be in communication with a fuel source and in communication with a steam source, thereby forming a combined fuel and steam nozzle.

In at least one embodiment, the cooling system housing may be concentric with the fuel nozzle. The cooling system housing may have an outer surface having a conical shape. The cooling system housing may have an inner surface having a conical shape. A distance between an outer surface of the fuel nozzle and the inner surface of the cooling system housing at a distal end of the cooling system housing may be less than a distance between an outer surface of the fuel nozzle and the inner surface of the cooling system housing at a proximal end at the combustor housing. A distal end of the cooling system housing may terminate closer to the combustor housing than a distal end of the fuel nozzle. The distal end of the fuel nozzle may extend from the distal end of the cooling system a distance between one quarter of an inch and 1¼ inches. The distal end of the fuel nozzle extends from the distal end of the cooling system a distance between ¼ of an inch and ¾ inch. The distal end of the fuel nozzle may include one or more exhaust orifices that exhaust fluids unrestricted by the housing forming the cooling system cooling chamber. The cooling system may also include one or more centering struts extending from an inner surface of the cooling system housing for maintaining the position of the housing around the fuel nozzle.

During use, shell air may be injected to into the combustor chamber for combustion. A portion of the shell air may instead of being injected into the combustor chamber may be bled off and injected into the cooling chamber formed by the space between the cooling system housing and the fuel nozzle. As such, the cooling system blankets the fuel nozzle with a small amount of shell air to cool the fuel nozzle regardless of whether the fuel nozzle is in use. Thus, the fuel nozzle within the secondary combustion zone need not be used at all times of operation of the gas turbine engine when fuel nozzles within the main combustion zone are used. Instead, the cooling system provides flexibility such that the fuel nozzles within the main combustion zone may be used without using the fuel nozzles 16 within the secondary combustion zone.

An advantage of the cooling system is that the cooling system provides cooling air to the cooling chamber surrounding at least a portion of the fuel nozzle, thereby preventing damage to the fuel nozzle when not used even though the combustor is in operation and the fuel nozzle is positioned within the combustor chamber. The nozzle can extend beyond the cooling chamber because a film of cooling air is developed in the passage which protects the tip of the nozzle.

Another advantage of the cooling system is that use of the cooling system enables a steam supply connected to the fuel nozzle to be shutoff when fuel to the nozzle is shutoff, unlike conventional systems in which steam must be continually supplied to a fuel nozzle, even when fuel is cutoff to that nozzle, to prevent damage to the fuel nozzle from the high temperature combustion gases.

Yet another advantage of the cooling system is that the centering struts align the cooling system housing around the fuel nozzle.

Another advantage of the cooling system is that the cooling system provides cooling air to the cooling chamber surrounding the fuel nozzle through which a mixture of fuel and steam is emitted during use and through which no steam or fuel flows during periods of nonuse.

Still another advantage of the cooling system is that the cooling system housing may have a length that ensures that the fuel nozzle remains cool but does not impact the fuel injection pattern from the tip of the fuel nozzle.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
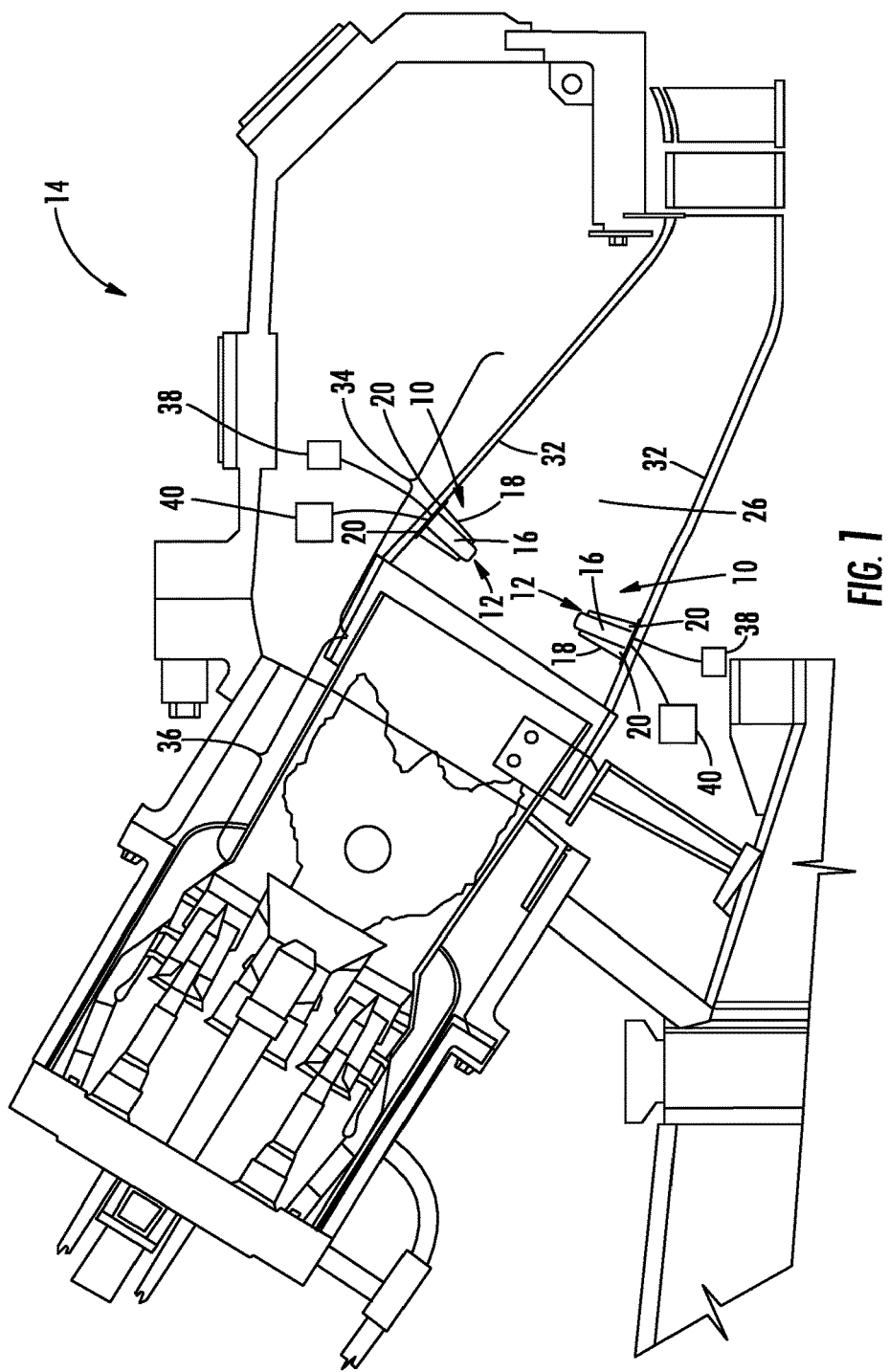
FIG. 1 is a cross-sectional side view of a portion of a turbine engine including a fuel system in a combustor with fuel nozzle positioned in a secondary combustion zone having a cooling system for protecting the fuel nozzles.
Figure 2:
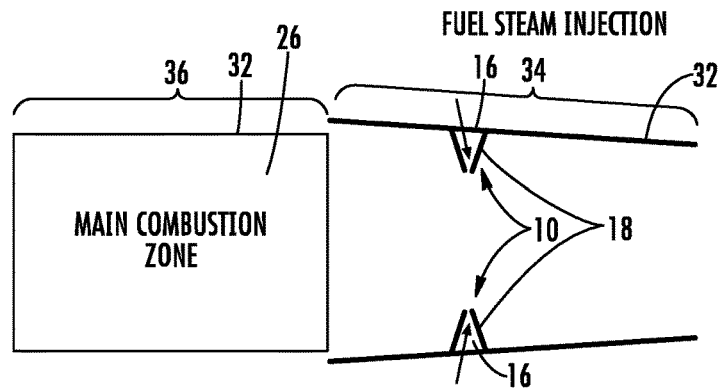
FIG. 2 is schematic view of a combustor with fuel nozzles positioned in a secondary combustion zone having a cooling system for protecting the fuel nozzles.
Figure 3:
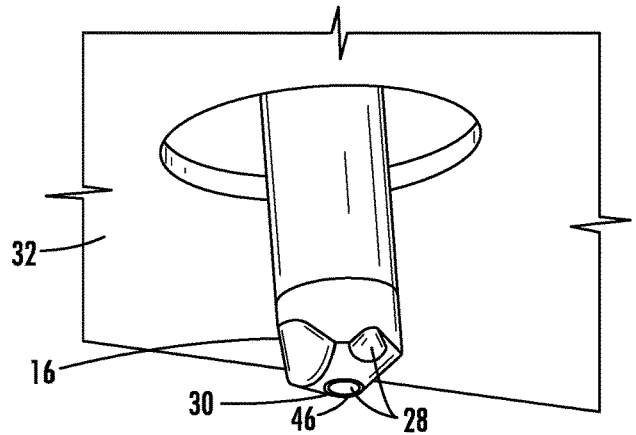
FIG. 3 is a perspective view of a fuel nozzle positioned in a secondary combustion zone within a combustor.
Figure 4:
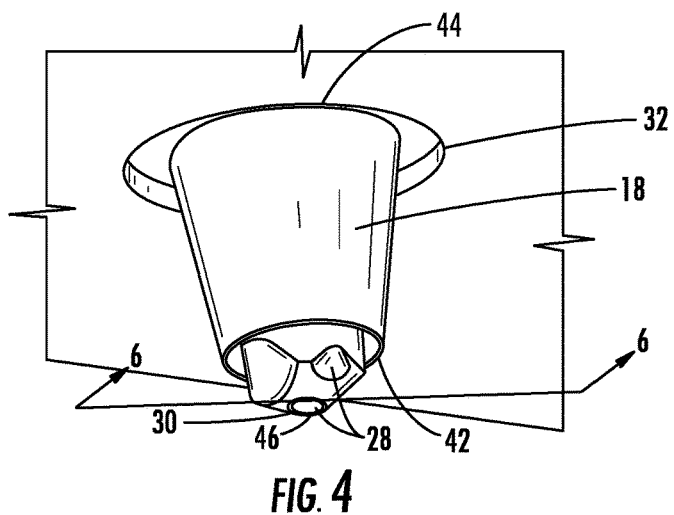
FIG. 4 is a perspective view of a fuel nozzle positioned in a secondary combustion zone within a combustor with a cooling system positioned around the fuel nozzle.

As shown in FIGS. 1-6, a cooling system 10 for a fuel system 12 in a turbine engine 14 that is usable to cool a fuel nozzle 16 is disclosed. The cooling system 10 may include one or more cooling system housings 18 positioned around the fuel nozzle 16 such that the cooling system housing 18 forms a cooling chamber 20 defined at least partially by an inner surface 22 of the cooling system housing 18 and an outer surface 24 of the fuel nozzle 16. The fuel nozzle 16 may extend into a combustor chamber 26 formed at least in part by a combustor housing 32. The fuel nozzle 16 may include one or more fuel exhaust orifices 32, as shown in FIGS. 3 and 4, an opening 30 in an outer surface 24 of the fuel nozzle 16 and configured to exhaust fluids unrestricted by the housing 18 forming the cooling system cooling chamber 20. The cooling system 10 may provide cooling fluids to cool the fuel nozzle 16 within the cooling system cooling chamber 20 regardless of whether the fuel nozzle 16 is in use.

In at least one embodiment, the cooling system 10 may include one or more fuel nozzles 16, as shown in FIG. 3, extending into a combustor chamber 26 formed at least in part by a combustor housing 32. The fuel nozzle 16 may include one or more fuel exhaust orifices 28 with an opening 30 in the outer surface 24 of the fuel nozzle 16, as shown in FIGS. 3 and 4. The cooling system housing 18 may be positioned around the fuel nozzle 16. In at least one embodiment, the fuel nozzle 16 may be an axial stage nozzle 16 positioned within a secondary combustion zone 34, which is downstream from a main combustion zone 36, as shown in FIGS. 1 and 2. The fuel nozzle 16 may be positioned generally orthogonal to a direction of hot gas flow within the secondary combustion zone 34. The fuel nozzle 16 may be in communication with a fuel source 38 and in communication with a steam source 40, thereby forming a combined fuel and steam nozzle 16.

Figure 5:
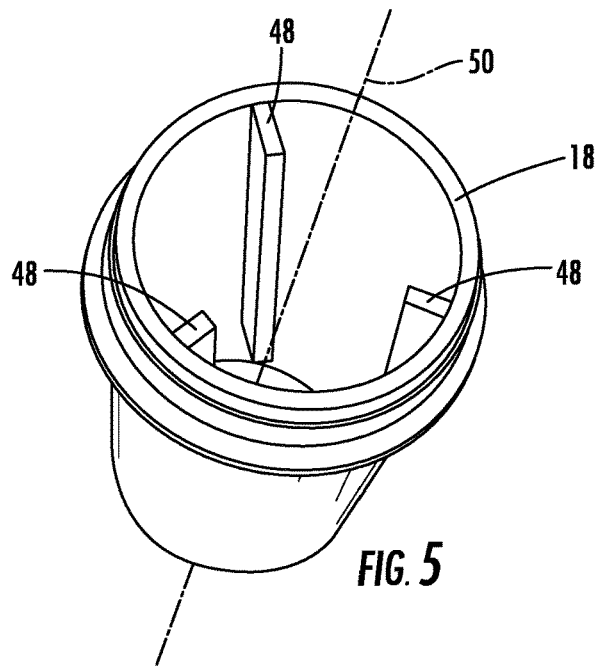
FIG. 5 is a perspective view of a cooling system housing having a plurality of centering struts extending radially inward from an inner surface of the cooling system housing.
Figure 6:
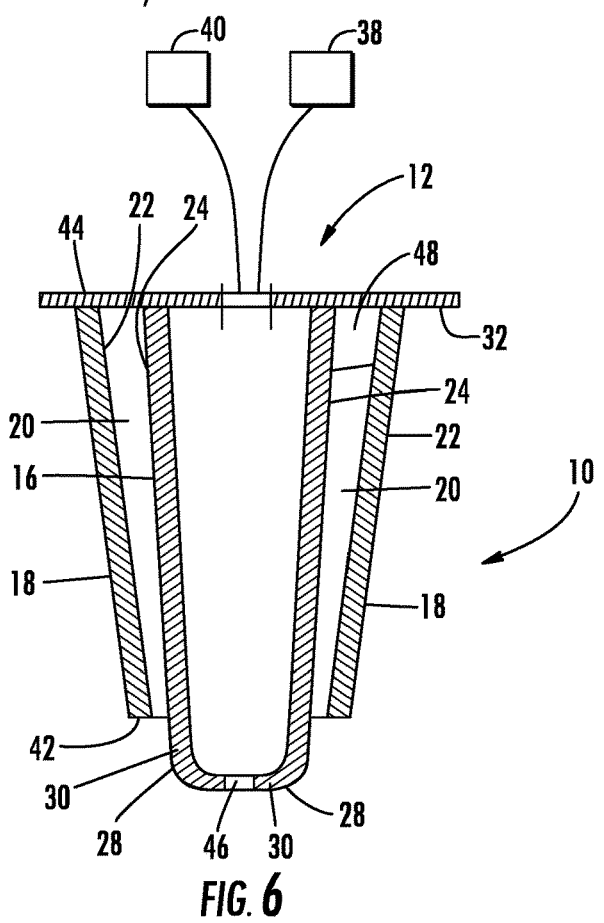
FIG. 6 is a cross-sectional view of the cooling system and the fuel nozzle taken along section line 6-6 in FIG. 4.

The cooling system housing 18, as shown in FIGS. 4 and 5, forms a cooling chamber 20 defined at least partially by an inner surface 22 of the cooling system housing 18 and an outer surface 24 of the fuel nozzle 16. In at least one embodiment, the cooling system housing 18 may be concentric with the fuel nozzle 16. As shown in FIG. 6, the cooling system housing 18 may have an outer surface having a conical shape. The cooling system housing 18 may have an inner surface 22 having a conical shape. In at least one embodiment, a distance between an outer surface 24 of the fuel nozzle 16 and the inner surface 22 of the cooling system housing 18 at a distal end 42 of the cooling system housing 18 is less than a distance between an outer surface 24 of the fuel nozzle 16 and the inner surface 22 of the cooling system housing 18 at a proximal end 44 at the combustor housing 32 at the combustor housing 32.

The distal end 42 of the cooling system housing 18 may terminate closer to the combustor housing 32 than the distal end 46 of the fuel nozzle 16, as shown in FIGS. 4 and 6. The distal end 46 of the fuel nozzle 16 may extend from the distal end 42 of the cooling system 10 a distance between one quarter of an inch and 1¼ inches. In another embodiment, the distal end 46 of the fuel nozzle 16 may extend from the distal end 42 of the cooling system 10 a distance between ¼ of an inch and ¾ inch. The distal end 46 of the fuel nozzle 16 may include one or more exhaust orifices 28 that exhaust fluids unrestricted by the housing 18 forming the cooling system cooling chamber 20.

The cooling system housing 18 may be formed from materials capable of being exposed to the high temperature gases found within the combustor chamber 26. The cooling system housing 18 may be formed from materials such as, but not limited to, HASTELLOY and INCONEL materials.

As shown in FIG. 5, the cooling system housing 18 may include one or more centering struts 48 extending from the inner surface 22 of the housing 18 toward a centerline 50 of the housing 18 for maintaining the position of the housing 18 around the fuel nozzle 16. The centering struts 48 may or may not be in contact with an outer surface 24 of the fuel nozzle 16. In embodiments in which the centering struts 48 contact the outer surface 24 of the fuel nozzle 16, an entire length of the centering strut 48 or a portion of the centering strut 48 may contact the fuel nozzle 16. The centering strut 48 may extend for an entire length of the cooling system housing 18 or for a portion of the length of the housing 18. In at least one embodiment, the cooling system 10 may include three centering struts 48 extending radially inward from the cooling system housing 18. In other embodiments, the cooling system 10 may include another number of centering struts 48 extending radially inward from the cooling system housing 18, such as one, two, four or more centering struts 48.

During use, shell air may be injected to into the combustor chamber 26 for combustion. A portion of the shell air may instead of being injected into the combustor chamber 26 may be bled off and injected into the cooling chamber 20 formed by the space between the cooling system housing 18 and the fuel nozzle 16. As such, the cooling system 10 blankets the fuel nozzle 16 with a small amount of shell air to cool the fuel nozzle 16 regardless of whether the fuel nozzle 16 is in use. Thus, the fuel nozzle 16 within the secondary combustion zone 34 need not be used at all times of operation of the gas turbine engine 14 when fuel nozzles within the main combustion zone 36 are used. Instead, the cooling system 10 provides flexibility such that the fuel nozzles within the main combustion zone 36 may be used without using the fuel nozzles 16 within the secondary combustion zone 34.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A cooling system for a fuel system of a turbine engine, comprising:
    at least one fuel nozzle extending into a combustion chamber formed at least in part by a combustor housing, wherein the at least one fuel nozzle includes at least one fuel exhaust orifice with an opening in an outer surface of the at least one fuel nozzle, wherein the at least one fuel nozzle is an axial stage nozzle positioned within a secondary combustion zone; and
    wherein the at least one cooling system housing forms a cooling chamber defined at least partially by an inner surface of the at least one cooling system housing and the outer surface of the at least one fuel nozzle, wherein the cooling chamber conveys cooling air arranged to surround the fuel nozzle and thus cool the fuel nozzle during combustor operation, regardless of whether the fuel nozzle is in use,
    wherein a distal end of the at least one cooling system housing terminates closer to the combustor housing than a distal end of the at least one fuel nozzle, and
    wherein at least one centering strut extends radially inward from the inner surface of the at least one cooling system housing for maintaining a position of the at least one cooling system housing around the fuel nozzle.

2. The cooling system of claim 1, wherein the at least one fuel nozzle is positioned generally orthogonal to a direction of hot gas flow within the secondary combustion zone.

3. The cooling system of claim 1, wherein the at least one fuel nozzle is in communication with a fuel source and in communication with a steam source, thereby forming a combined fuel and steam nozzle.

4. The cooling system of claim 1, wherein the at least one cooling system housing is concentric with the at least one fuel nozzle.

5. The cooling system of claim 1, wherein the at least one cooling system housing has the outer surface having a conical shape and wherein the at least one cooling system housing has the inner surface having a conical shape.

6. The cooling system of claim 1, wherein a distance between the outer surface of the at least one fuel nozzle and the inner surface of the at least one cooling system housing at a distal end of the at least one cooling system housing is less than a distance between the outer surface of the at least one fuel nozzle and the inner surface of the at least one cooling system housing at a proximal end at the combustor housing.

7. The cooling system of claim 1, wherein the distal end of the at least one fuel nozzle extends from the distal end of the at least one cooling system housing a distance between one quarter of an inch and 1¼ inches.

8. The cooling system of claim 1, wherein the distal end of the at least one fuel nozzle extends from the distal end of the at least one cooling system housing a distance between ¼ of an inch and ¾ inch.

9. The cooling system of claim 1, wherein the distal end of the at least one fuel nozzle includes at least one exhaust orifice that exhausts fluids unrestricted by the housing forming the at least one cooling system cooling chamber.

10. A cooling system for a fuel system of a turbine engine, comprising:
    at least one fuel nozzle extending into a combustion chamber formed at least in part by a combustor housing, wherein the at least one fuel nozzle includes at least one fuel exhaust orifice with an opening in an outer surface of the at least one fuel nozzle, wherein the at least one fuel nozzle is an axial stage nozzle positioned within a secondary combustion zone;
    at least one cooling system housing positioned around the at least one fuel nozzle, wherein the at least one cooling system housing forms a cooling chamber defined at least partially by an inner surface of the at least one cooling system housing and the outer surface of the at least one fuel nozzle, wherein the cooling chamber conveys cooling air arranged to surround the fuel nozzle and thus cool the fuel nozzle during combustor operation, regardless of whether the fuel nozzle is in use;
    wherein a distance between the outer surface of the at least one fuel nozzle and the inner surface of the at least one cooling system housing at a distal end of the at least one cooling system housing is less than a distance between the outer surface of the at least one fuel nozzle and the inner surface of the at least one cooling system housing at a proximal end at the combustor housing; and
    wherein a distal end of the at least one cooling system housing terminates closer to the combustor housing than a distal end of the at least one fuel nozzle.

11. The cooling system of claim 10, wherein the at least one fuel nozzle is in communication with a fuel source and in communication with a steam source, thereby forming a combined fuel and steam nozzle.

12. The cooling system of claim 10, wherein the at least one cooling system housing is concentric with the at least one fuel nozzle.

13. The cooling system of claim 10, wherein the at least one cooling system housing has the outer surface having a conical shape and wherein the at least one cooling system housing has the inner surface having a conical shape.

14. The cooling system of claim 10, wherein the distal end of the at least one fuel nozzle extends from the distal end of the at least one cooling system housing a distance between one quarter of an inch and 1¼ inches.

15. The cooling system of claim 10, wherein the distal end of the at least one fuel nozzle includes at least one exhaust orifice that exhausts fluids unrestricted by the housing forming the at least one cooling system cooling chamber.

16. A cooling system for a fuel system of a turbine engine, comprising:

at least one fuel nozzle extending into a combustor chamber formed at least in part by a combustor housing, wherein the at least one fuel nozzle includes at least one fuel exhaust orifice with an opening in an outer surface of the at least one fuel nozzle;

at least one cooling system housing positioned around the at least one fuel nozzle, wherein the at least one cooling system housing forms a cooling chamber defined at least partially by an inner surface of the at least one cooling system housing and the outer surface of the at least one fuel nozzle, wherein the cooling chamber conveys cooling air arranged to surround the fuel nozzle and thus cool the fuel nozzle during combustor operation, regardless of whether the fuel nozzle is in use;

wherein the at least one fuel nozzle is an axial stage nozzle positioned within a secondary combustion zone;

wherein the at least one fuel nozzle is in communication with a fuel source and in communication with a steam source, thereby forming a combined fuel and steam nozzle;

wherein the at least one cooling system housing has the inner surface having a conical shape;

wherein a distal end of the at least one cooling system housing terminates closer to the combustor housing than a distal end of the at least one fuel nozzle;

wherein the distal end of the at least one fuel nozzle includes at least one exhaust orifice that exhausts fluids unrestricted by the housing forming the at least one cooling system cooling chamber; and at least one centering strut extending from the inner surface of the at least one cooling system housing.

\* \* \* \* \*